United States Patent
Hosaka (10) Patent No.: US 11,660,693 B2
(45) Date of Patent: May 30, 2023

(54) ELECTRIC DISCHARGE MACHINE (71) Applicant: Sodick Co., Ltd., Kanagawa (JP)

(72) Inventor: Akio Hosaka, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 310 days.

(21) Appl. No.: 17/204,931

(22) Filed: Mar. 17, 2021

(65) Prior Publication Data

US 2021/0316381 A1 Oct. 14, 2021

(30) Foreign Application Priority Data

Apr. 13, 2020 (JP) .............................. JP2020-071503

(51) Int. Cl.
*B23H 7/36* (2006.01)
*B23H 1/10* (2006.01)
*B01D 35/30* (2006.01)
*B23H 11/00* (2006.01)
*B23H 5/14* (2006.01)

(52) U.S. Cl.
CPC ................. *B23H 7/36* (2013.01); *B23H 5/14* (2013.01); *B23H 11/00* (2013.01)

(58) Field of Classification Search
CPC .......... B01D 35/306; B23H 1/10; B23H 5/13; B23H 7/36; B32H 7/101
See application file for complete search history.

(56) References Cited

FOREIGN PATENT DOCUMENTS

| EP | 2842679 A1 | * | 3/2015 | ............. B01D 35/02 |
| JP | H0379045 | | 4/1991 | |
| JP | H0379045 | | 12/1991 | |
| JP | 3062446 | | 10/1999 | |
| JP | 2005161279 A | * | 6/2005 | |
| JP | 5111678 B1 | * | 1/2013 | ............. B01D 29/13 |

OTHER PUBLICATIONS

Machine translation of JP2005161279A, Mar. 2023.*

* cited by examiner

*Primary Examiner* — Geoffrey S Evans
(74) *Attorney, Agent, or Firm* — JCIPRNET (57) ABSTRACT

An electric discharge machine 1 incudes: a machining tank 11; a dirty fluid tank 13; a circulation pump 21; a filter unit 3 including a filter element 31 and a filter case 33; a fixing mechanism 5 fixing the filter unit; a clean fluid tank 15; and a fluid feeding pump 23. The fixing mechanism includes: a bracket 51 fixed in a predetermined position; a rotating member 53 rotatably connected to the bracket; a lever 6 having: a link 61 of which one end is connected to the rotating member, a nut 63 arranged on the other end of the link, and a rod 65 screwed with the nut; a locked member 55 fixed to the bracket and engaged with the rod; and a pressing member 7 of which one end is connected to the rotating member 53 and the other end presses the filter case.

6 Claims, 6 Drawing Sheets

ELECTRIC DISCHARGE MACHINE

CROSS-REFERENCE TO RELATED APPLICATION

This application claims the priority benefit of Japan Application No. 2020-071503, filed on Apr. 13, 2020. The entirety of the above-mentioned patent application is hereby incorporated by reference herein and made a part of this specification.

BACKGROUND

Technical Field

The disclosure relates to an electric discharge machine.

Related Art

An electric discharge machine applies a machining voltage to a machining gap, which is formed by a tool electrode (hereinafter simply referred to as an electrode) and a workpiece that is placed in a machining tank and disposed facing the electrode, to generate an electric discharge, and relatively moves the electrode and the workpiece to machine the workpiece into a desired shape by electric discharge energy.

With the aims of the insulation recovery between the electrode and the workpiece, the cooling of the workpiece, the removal of chips, and the like, the machining gap is submerged in insulative machining fluid or the insulative machining fluid is jetted to the machining gap, and thereby the machining fluid is supplied to the machining gap during electric discharge machining.

The machining fluid containing chips generated by the electric discharge machining is drained to a dirty fluid tank from the machining tank. From the machining fluid stored in the dirty fluid tank, the chips are removed by a filter unit, and then the machining fluid is fed to a clean fluid tank. The machining fluid stored in the clean fluid tank is fed to the machining tank once again and supplied to the machining gap. In this way, the machining fluid is reused.

The filter unit includes a filter element which filters the machining fluid and a filter case which accommodates the filter element. The filter unit is fixed in a predetermined position in the electric discharge machine. For example, a filter unit disclosed in Japanese Patent Publication No. H03-079045 is fixed as below. Firstly, a lower portion of the filter case is fitted to a pipe erected in a predetermined position, and a bolt extending upward from the pipe is inserted into an inside of the filter element. Then, an upper surface of the filter case is pressed by a nut screwed with the bolt, and the filter unit is fixed.

Figure 1:
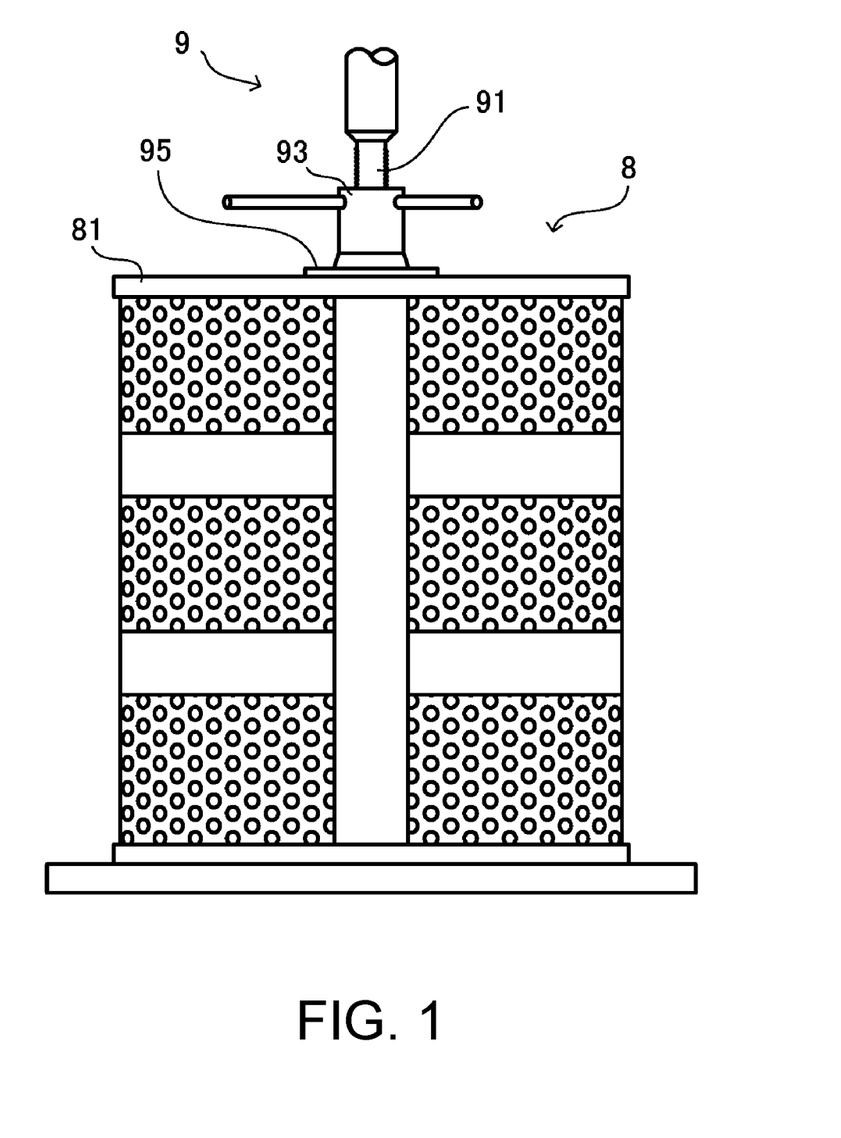
FIG. 1 is a schematic configuration view of a conventional fixing mechanism.

As another fixing method, for example, a fixing mechanism shown in FIG. 1 is well-known. A fixing mechanism 9 shown in FIG. 1 includes: a screw shaft 91 which is arranged above a fixed position of a filter unit 8 and extends downward, a nut 93 screwed with the screw shaft 91, and an abutting plate 95 fixed to the nut 93. The nut 93 is screwed backward and downward with respect to the screw shaft 91, and thereby the abutting plate 95 presses an upper surface of a filter case 81 and fixes the filter unit 8.

During the replacement of the filter unit, the pressing to the filter case is released. In a conventional electric discharge machine, when the filter unit is replaced, the nut and a pressing member such as the abutting plate or the like are required to be sufficiently screwed forward or screwed backward. Therefore, a replacement operation of the filter unit relatively takes a lot of time and labor.

The disclosure aims to provide an electric discharge machine which is capable of fixing the filter unit by an easier method.

SUMMARY

According to the disclosure, an electric discharge machine is provided which includes: a machining tank in which a workpiece is accommodated; a dirty fluid tank which stores a machining fluid drained from the machining tank; a circulation pump which draws up the machining fluid in the dirty fluid tank; a filter unit including a filter element which filters the machining fluid fed by the circulation pump and a filter case which accommodates the filter element; a fixing mechanism which fixes the filter unit; a clean fluid tank which stores the machining fluid filtered by the filter unit; and a fluid feeding pump which draws up the machining fluid in the clean fluid tank and feeds the machining fluid to the machining tank; wherein the fixing mechanism includes: a bracket which is fixed in a predetermined position; a rotating member which is rotatably connected to the bracket; a lever having: a link of which one end is connected to the rotating member, a nut arranged on the other end of the link, and a rod screwed with the nut; a locked member which is fixed to the bracket and engaged with the rod; and a pressing member of which one end is connected to the rotating member and the other end presses the filter case.

DESCRIPTION OF THE EMBODIMENTS

In the electric discharge machine according to the disclosure, the filter case and the pressing member can be sufficiently separated by screwing the rod backward with respect to the nut to release the engagement with the locked portion and rotating the lever. Since a screw-back distance of the rod may be short in a range in which the engagement with the locked member can be released, the replacement operation of the filter unit is easy compared with the conventional technology, and a burden on the operator can be reduced.

Hereinafter, an embodiment of the disclosure is described using FIG. 2 to FIG. 6. Various variation examples described below may be respectively implemented in any combination.

An electric discharge machine 1 according to the embodiment is a wire electric discharge machine using a wire electrode as an electrode E, but may also be another electric discharge machine such as a sinker electric discharge machine or a small-hole electric discharge machine. In addition, as a machining fluid L, an insulative fluid such as an aqueous machining fluid or an oily machining fluid is used. When the machining fluid L contains pure water as a main component, a water purifier containing an ion exchange resin may be disposed in a supply and discharge path of the machining fluid L.

Figure 2:
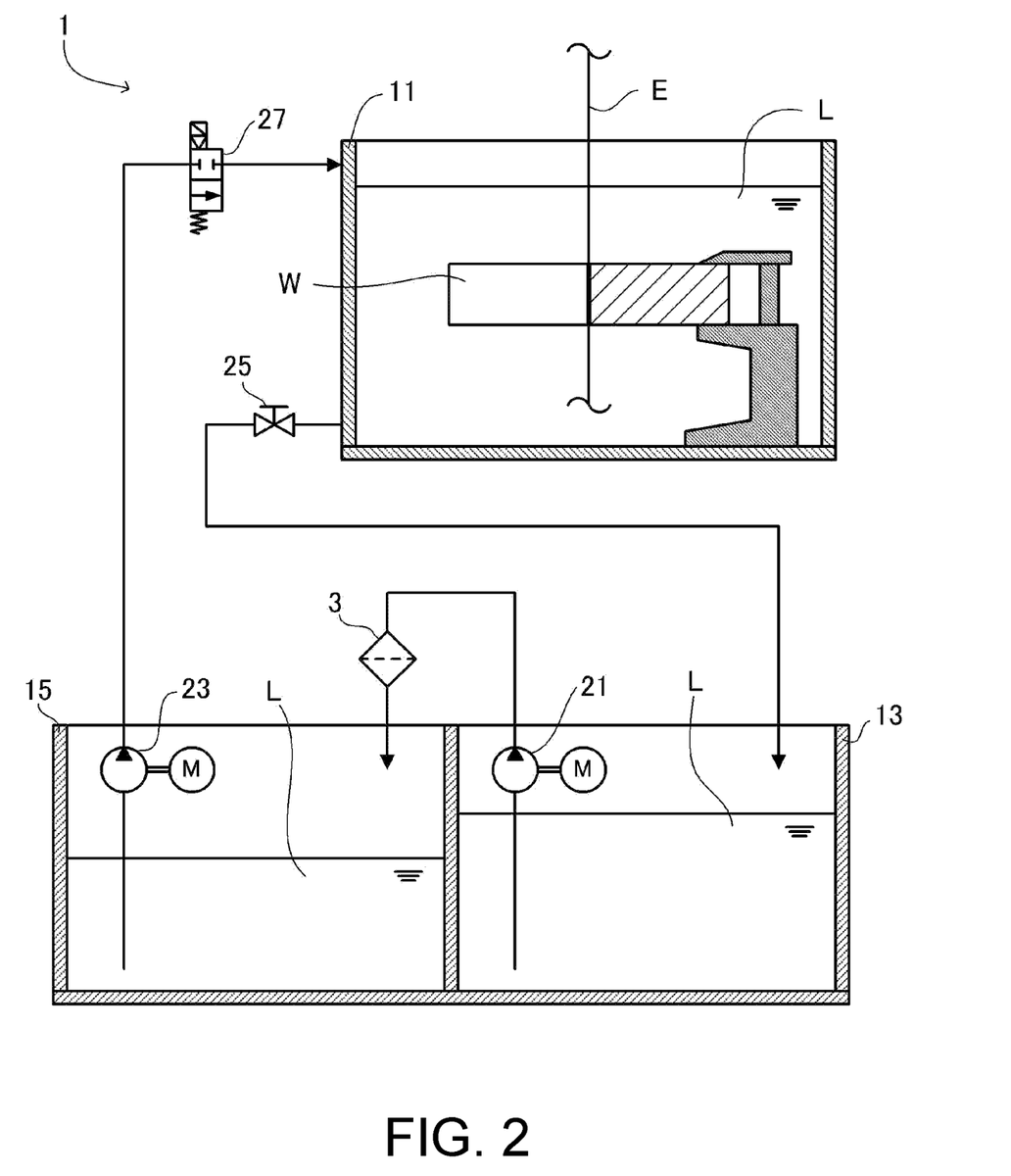
FIG. 2 is a circuit diagram showing a supply and discharge path of a machining fluid of an electric discharge machine of the embodiment.
Figure 3:
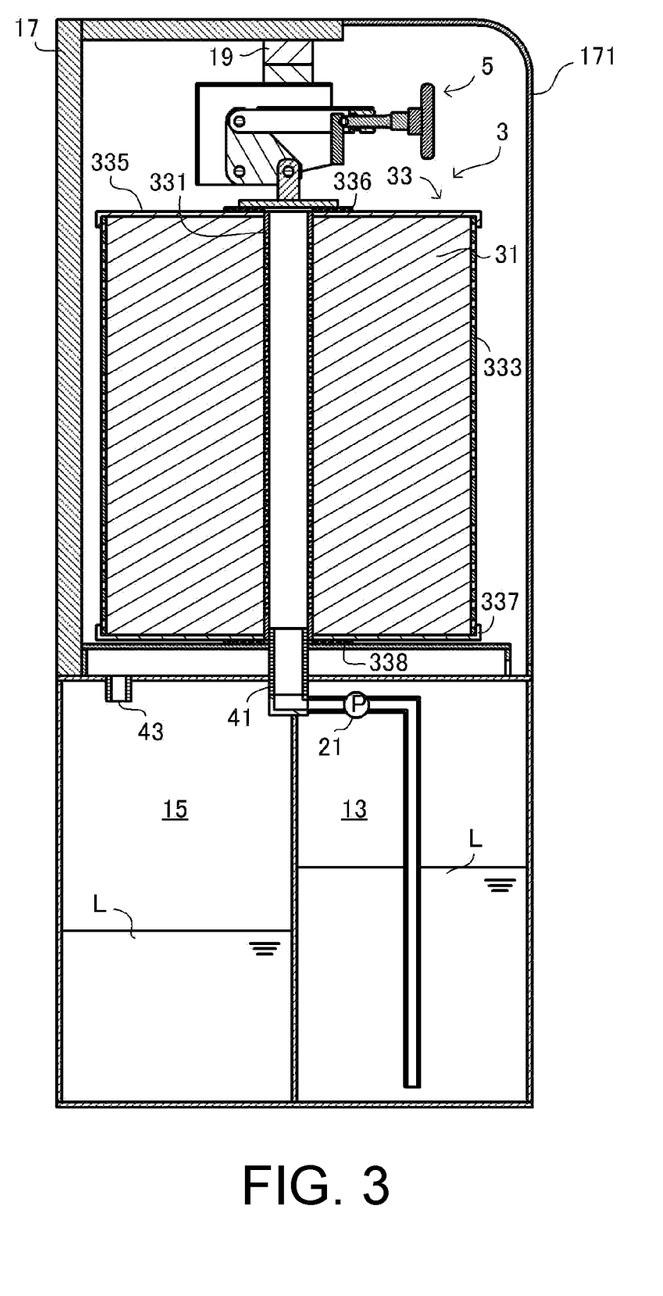
FIG. 3 is a cross-sectional view of a filter unit and a fixing mechanism of the embodiment.

As shown in FIG. 2 and FIG. 3, the electric discharge machine 1 of the embodiment includes: a machining tank 11, a dirty fluid tank 13, a circulation pump 21, a filter unit 3, a fixing mechanism 5, a clean fluid tank 15, and a fluid feeding pump 23.

In the machining tank 11, a workpiece W which is an object of electric discharge machining is accommodated. The electrode E or the workpiece W is configured so as to be relatively movable, and the workpiece W is disposed facing the electrode E with a predetermined machining gap during the electric discharge machining. Machining voltages having different polarities are respectively applied to the electrode E and the workpiece W from a power supply (not shown), and a part of the workpiece W is removed by the electric discharge.

During the electric discharge machining, the machining fluid L is supplied to the machining tank 11, and the machining gap is filled with the machining fluid L. Specifically, the machining fluid L may be supplied from a supply port arranged in the machining tank 11, and the machining gap may be submerged in the machining fluid L. Alternatively, the machining fluid L may be jetted with respect to the machining gap via a nozzle or the like. That is, the electric discharge machine 1 may perform a submerged machining in which the machining gap is submerged in the machining fluid L and the machining is performed, or may perform a flushing machining in which the machining is performed while the machining fluid L is being jetted to the machining gap.

The machining fluid L supplied to the machining tank 11 is fed to the dirty fluid tank 13. When the electric discharge machine 1 performs the submerged machining, it is desirable that a fluid level of the machining fluid L in the machining tank 11 be constantly maintained by adjusting an opening degree of a drain valve 25.

The dirty fluid tank 13 recovers and stores the used machining fluid L containing chips. The machining fluid L in the dirty fluid tank 13 is drawn up by the circulation pump 21 and is fed to the filter unit 3. The details of the filter unit 3 and the fixing mechanism 5 which fixes the filter unit 3 are described later. Besides, the dirty fluid tank 13 may be divided into a plurality of tanks and purify the machining fluid L in stages. For example, the dirty fluid tank 13 may have a first tank to which the machining fluid L drained from the machining tank 11 is fed and a second tank which stores the machining fluid L fed to the clean fluid tank 15 via the filter unit 3. At this time, a circulation pump which pressure-feeds the machining fluid L from the first tank to the second tank, a filter unit which filters the machining fluid L fed from the circulation pump, and a fixing mechanism which fixes the filter unit are further arranged.

The clean fluid tank 15 stores the machining fluid L which is filtered by the filter unit 3 and from which the chips are removed. The machining fluid L in the clean fluid tank 15 is drawn up by the fluid feeding pump 23 and fed to the machining tank 11 by an electromagnetic valve 27. As described before, when the machining fluid L is supplied to the machining tank 11, the machining fluid L may be supplied from the supply port arranged in the machining tank 11, or the machining fluid L may be supplied from the nozzle which jets the machining fluid L to the machining gap.

According to the above configuration, the machining fluid L is circulated in the machining tank 11, the dirty fluid tank 13, the filter unit 3 and the clean fluid tank 15, and is reused after the chips are removed.

Here, the filter unit 3 and the fixing mechanism 5 are described in detail. Besides, as shown in FIG. 3, the electric discharge machine 1 preferably further includes a filter chamber 17 which accommodates the filter unit 3 and the fixing mechanism 5. In the embodiment, the filter chamber 17 is arranged above the dirty fluid tank 13 and the clean fluid tank 15. An opening for operation is formed on the filter chamber 17, and an openable/closable or attachable/detachable door 171 is arranged at the opening. When the filter unit 3 is replaced, the door 171 is opened or detached, and the handling of the fixing mechanism 5 and the carrying-in and the carrying-out of the filter unit 3 are performed via the opening.

For example, the filter unit 3 is an internal pressure filter, filters the machining fluid L supplied to the inside, and drains the filtered machining fluid L from a side surface. As shown in FIG. 3, the filter unit 3 includes a filter element 31 and a filter case 33.

The filter element 31 filters the machining fluid L fed from the dirty fluid tank 13 by the circulation pump 21 and drains the filtered machining fluid L to the clean fluid tank 15 after removing the chips. The filter element 31 of the embodiment is formed in a hollow cylindrical shape. For example, the filter element 31 is formed in a way of rolling up filter paper or nonwoven fabric which is folded in a bellows shape into a tubular shape.

The filter case 33 surrounds and accommodates the filter element 31. Specifically, the filter case 33 has an intermediate cylinder 331, an outer cylinder 333, and a pair of lids 335 and 337. The intermediate cylinder 331 is inserted into the filter element 31. The outer cylinder 333 covers a side surface of the filter element 31. On the intermediate cylinder 331 and the outer cylinder 333, through-holes allowing the machining fluid to pass therethrough are respectively formed. The pair of lids 335 and 337 are respectively arranged on both ends of the intermediate cylinder 331 and the outer cylinder 333. The lids 335 and 337 block at least a space between the intermediate cylinder 331 and the outer cylinder 333. In the embodiment, the lids 335 and 337 merely block the space between the intermediate cylinder 331 and the outer cylinder 333. In other words, each of the lids 335 and 337 have a through-hole on an inner side of the intermediate cylinder 331. The lids 335 and 337 are desirable to respectively have seal members 336 and 338 around the through-hole. The lid 335 positioned on one end side (e.g., an upper side in the embodiment) of the intermediate cylinder 331 and the outer cylinder 333 is configured so as to be capable of abutting against a pressing member 7 of the fixing mechanism 5 described later and is pressed by the pressing member 7. From the lid 337 positioned on the other end side (e.g., a lower side in the embodiment) of the intermediate cylinder 331 and the outer cylinder 333, the machining fluid is introduced to the inside of the filter unit 3. The through-hole of the lid 337 is inserted into a supply pipe 41 which is erected on a bottom plate of the filter chamber 17 and connected to the circulation pump 21.

The machining fluid L supplied to the intermediate cylinder 331 from the through-hole of the lid 337 is fed to the filter element 31 through the through-hole of the intermediate cylinder 331. The machining fluid L which passes through the filter element 31 is drained from the side surface of the filter unit 3 through the through-hole of the outer cylinder 333. The machining fluid L drained from the filter unit 3 flows out to the clean fluid tank 15 from a drain port 43 formed on the bottom plate of the filter chamber 17.

Besides, the electric discharge machine 1 of the embodiment is configured in a way that the filter unit 3 is disposed to extend in a vertical direction, the machining fluid L is introduced from a lower part of the filter unit 3, and an upper part of the filter unit 3 is pressed by the fixing mechanism 5. Instead of this, the electric discharge machine 1 of the embodiment may be configured in a way that the machining fluid L is introduced from the upper part of the filter unit 3, and the lower part of the filter unit 3 is pressed by the fixing mechanism 5. Alternatively, the filter unit 3 may be disposed in a way of extending in a horizontal direction. However, it is preferable that the upper part of the filter unit 3 disposed in a way of extending in the vertical direction be fixed by the fixing mechanism 5 as in the embodiment, because workability is superior.

In addition, in the embodiment, the lids 335 and 337 have the same shape. The filter unit 3 is mounted in a way that the lid 335 becomes the upper side and the lid 337 becomes the lower side in the embodiment, but the filter unit 3 may also be mounted in a way that the lid 337 becomes the upper side and the lid 335 becomes the lower side. By setting the lids 335 and 337 into the same shape, the filter unit 3 can be mounted without regarding the direction. However, a pair of lids may be set into different shapes respectively, for example, the lid on a side abutting against the pressing member 7 may have no through-hole.

In addition, only one filter unit 3 is shown in the drawings, but a plurality of filter units 3 may be arranged in order to improve a purification efficiency of the machining fluid L. In this case, the fixing mechanism 5 is arranged for each of the filter units 3. Because the fixing mechanism 5 of the disclosure can easily perform the fixation and the fixation releasing of the filter unit 3, even if a plurality of filter units 3 are arranged, the replacement of the filter units 3 can be performed in a short time. In addition, when the electric discharge machine 1 includes a plurality of filter units 3, the electric discharge machine 1 may be configured in a way of stopping the supply of the machining fluid L to a predetermined filter unit 3 during the replacement of the predetermined filter unit 3 and performing the filtration of the machining fluid L only in another filter unit 3. In this way, even during the electric discharge machining, the replacement of the filter unit 3 can be performed while the purification of the machining fluid L is being performed.

Figure 4:
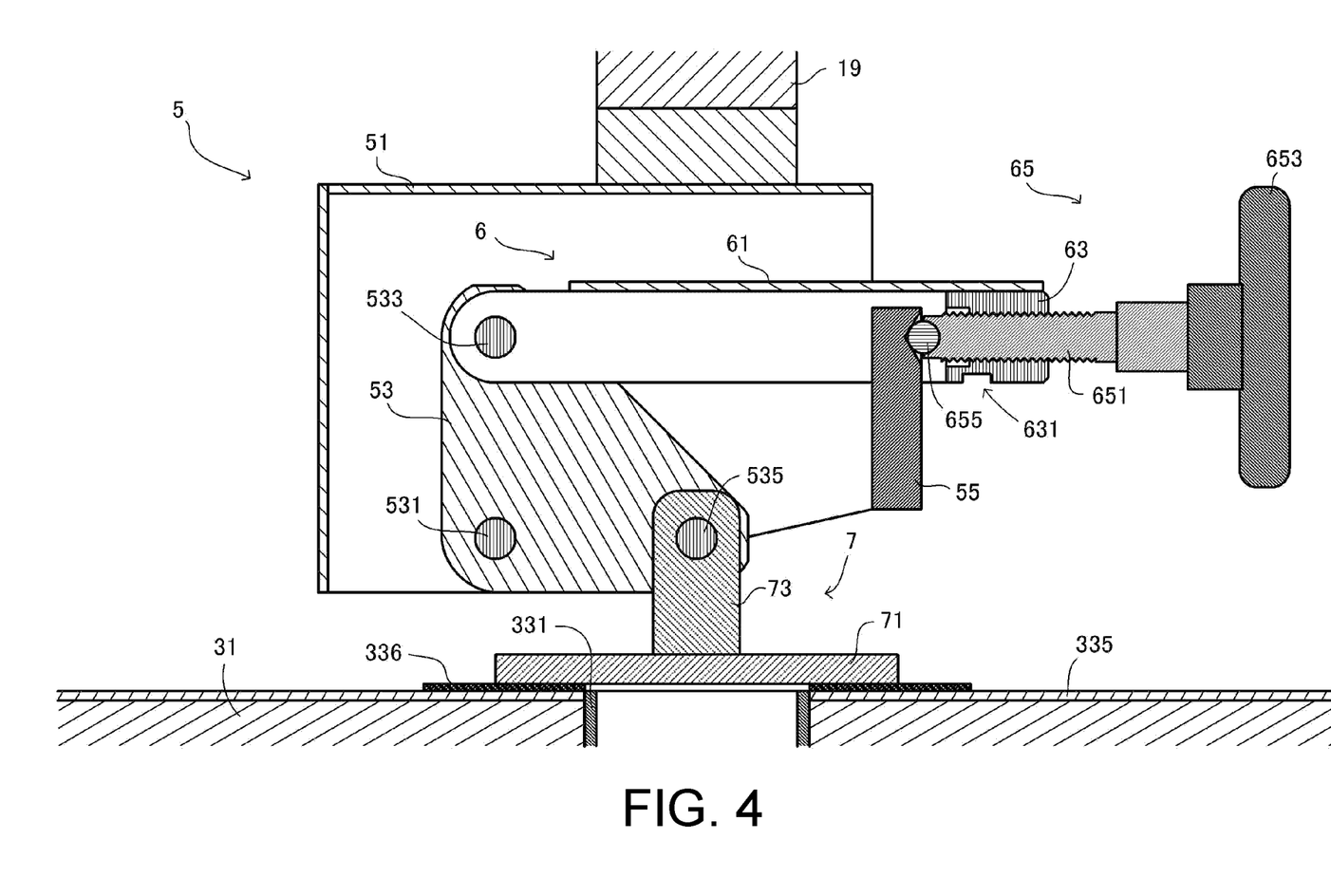
FIG. 4 is an enlarged cross-sectional view of the fixing mechanism of the embodiment.
Figure 5:
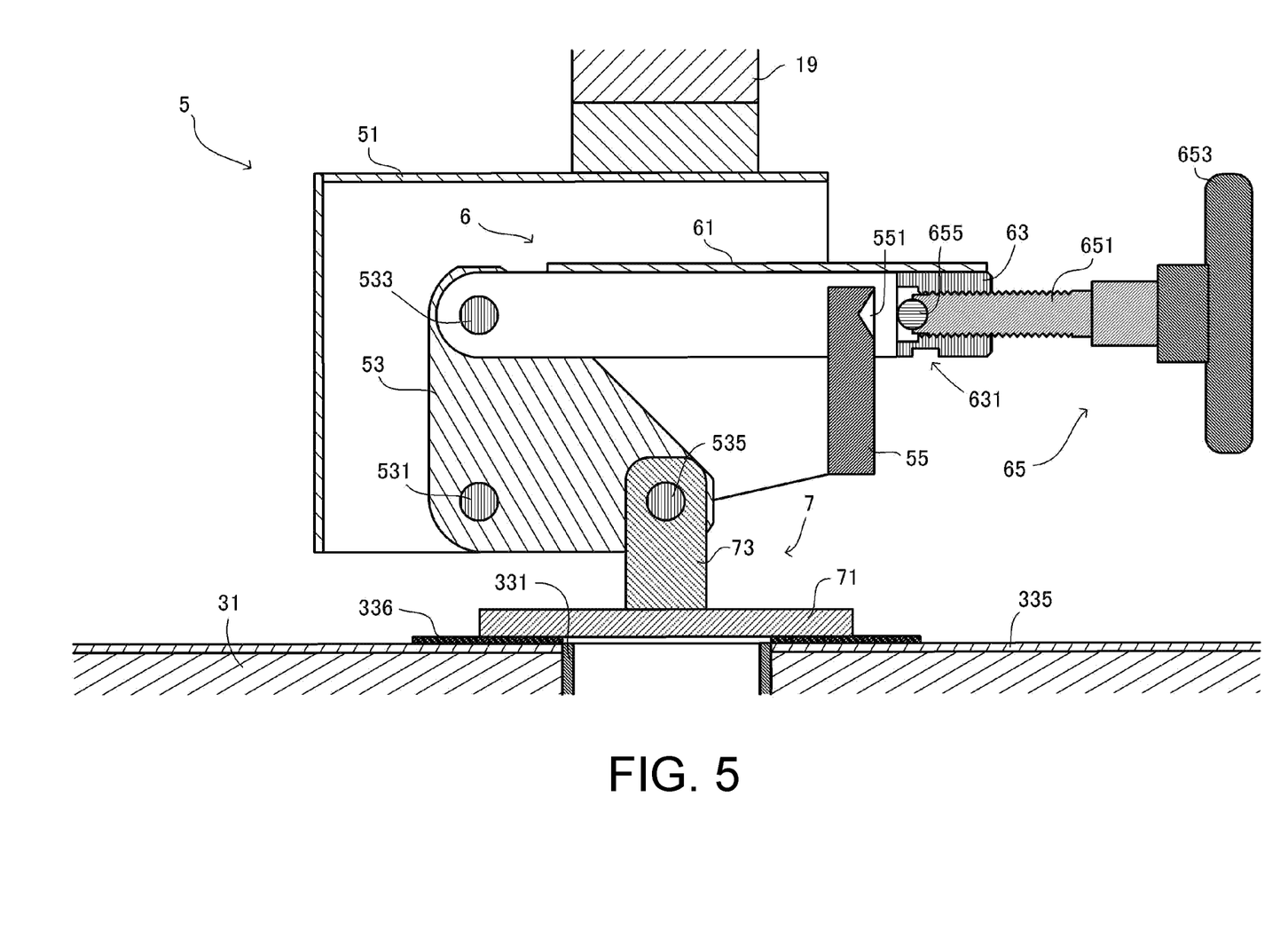
FIG. 5 is an enlarged cross-sectional view of the fixing mechanism of the embodiment.
Figure 6:
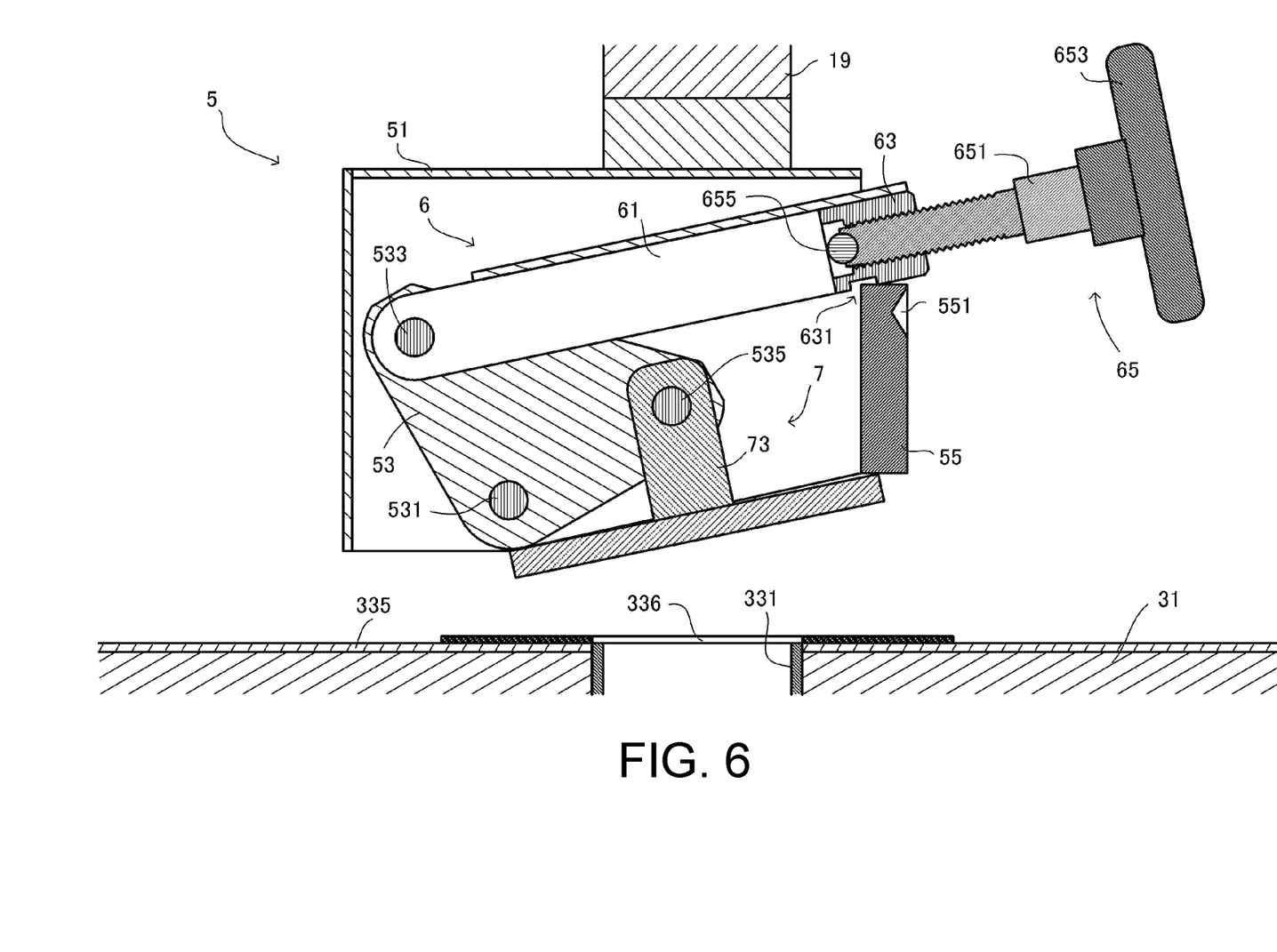
FIG. 6 is an enlarged cross-sectional view of the fixing mechanism of the embodiment.

The fixing mechanism 5 fixes the filter unit 3 to a predetermined position. As shown in FIG. 4 to FIG. 6, the fixing mechanism 5 includes a bracket 51, a rotating member 53, a lever 6, a locked member 55, and the pressing member 7.

The bracket 51 is fixed to a predetermined position and holds the rotating member 53 and the locked member 55. The locked member 55 is a block body which is fixed to the bracket 51 and may be in any shape. In order to perform an engagement more suitably, a locked portion 551 which has, for example, a recessed shape, may be formed on the locked member 55. The bracket 51 of the embodiment has a top plate and three side plates extending from the top plate, and is open on a lower side and a handling side of the fixing mechanism 5, that is, a right side in FIG. 4 to FIG. 6. The rotating member 53 is disposed inside the bracket 51. In addition, the locked member 55 is fixed to an opening side of the bracket 51. Between the top plate of the bracket 51 and the locked member 55, a predetermined gap into which a part of the lever 6 can be inserted is arranged. The bracket 51 is fixed to a top plate of the filter chamber 17 via a connection member 19 in the embodiment, but may also be in another form as long as the bracket 51 is fixed in the predetermined position.

The rotating member 53 is connected to the bracket 51 via a first shaft 531 and is configured in a way of rotatably around the first shaft 531. The lever 6 is connected to the rotating member 53. Preferably, the lever 6 is connected to the rotating member 53 via a second shaft 533 and is configured in a way of rotatably around the second shaft 533. The pressing member 7 is connected to the rotating member 53. Preferably, the pressing member 7 is connected to the rotating member 53 via a third shaft 535 and is configured in a way of rotating freely around the third shaft 535. The rotating member 53 may be in any shape as long as the rotating member 53 is configured in a way of rotatably around the first shaft 531. In the embodiment, the rotating member 53 has a pair of rotating plates having substantially right-angled triangle shapes. Besides, the rotating plate may have another shape such as a substantially L-shape. In addition, a connection position between the bracket 51 and the rotating member 53 (that is, a position of the first shaft 531), a connection position between the rotating member 53 and the lever 6 (that is, a position of the second shaft 533), and a connection position between the rotating member 53 and the pressing member 7 (that is, a position of the third shaft 535) are not limited to positions shown in FIG. 4 to FIG. 6.

The lever 6 has a link 61, a nut 63, and a rod 65. For example, the link 61 has a pair of side plates and an upper plate which connects the pair of side plates. The pair of side plates of the link 61 are separated from each other so as not to interfere with the locked member 55. One end of the link 61 is sandwiched by the pair of rotating plates of the rotating member 53 and is connected to the rotating member 53 via the second shaft 533 in a way of rotating freely. On the other end of the link 61, the nut 63 is arranged. A notch 631 is formed on at least a part of the nut 63. The rod 65 has a screw shaft 651, a handle 653, and a locking member 655. The locking member 655 is arranged on one end of the screw shaft 651, and the handle 653 is arranged on the other end of the screw shaft 651. The screw shaft 651 has a male screw portion on at least a part of the screw shaft 651 and is capable of being screwed with the nut 63. The handle 653 is formed lager than the screw shaft 651, and enables an operator to easily rotate the screw shaft 651. According to the above configuration, by rotating the screw shaft 651 to screw the screw shaft 651 forward with respect to the nut 63, the locking member 655 of the rod 65 and the locked portion 551 of the locked member 55 are engaged. Hereinafter, this state is referred to as an engagement state. In addition, by rotating the screw shaft 651 to screw the screw shaft 651 backward with respect to the nut 63, the engagement between the locking member 655 of the rod 65 and the locked portion 551 of the locked member 55 is released. Hereinafter, this state is referred to as a non-engagement state. Besides, the link 61 is formed sufficiently long so that the locked member 55 is sandwiched by the nut 63 and a connection portion between the link 61 and the rotating member 53 (that is, the second shaft 533) when in the engagement state.

Besides, the lever 6 desirably extends to an opening side of the filter chamber 17. In this way, the operator can perform the handling of the fixing mechanism 5 more easily.

With regard to the pressing member 7, one end is connected to the rotating member 53, and the other end presses the filter case 33. Specifically, the pressing member 7 has an abutting plate 71 and an erection member 73. In the engagement state, the abutting plate 71 abuts and presses against the lid 335 of the filter case 33 and fixes the filter unit 3 to the predetermined position. At this time, when the lid 335 has the through-hole as in the embodiment, the abutting plate 71 also functions to block the through-hole of the lid 335. In addition, by rotating the lever 6 in the non-engagement state, the abutting plate 71 is separated from the lid 335 of the filter case 33, and releases the fixation of the filter unit 3. The erection member 73 is erected on the abutting plate 71, sandwiched by the pair of rotating plates of the rotating member 53 on a front end, and connected to the rotating member 53 via the third shaft 535 in a way of rotating freely.

Here, a procedure of the fixation releasing of the filter unit 3 by the above fixing mechanism 5 is described. In FIG. 4, a state is shown in which the lever 6 is in the engagement state and the filter unit 3 is fixed to the predetermined position. When releasing the fixation of the filter unit 3 and detaching the filter unit 3, firstly, the operator rotates the screw shaft 651 and screws the screw shaft 651 backward with respect to the nut 63. A screw-back distance of the screw shaft 651 may be short in a range in which the engagement with the locked member 55 can be released. In this way, as shown in FIG. 5, the locking member 655 and the locked portion 551 are separated. Then, as shown in FIG. 6, the operator rotates the lever 6. After that, the pressing member 7 is rotated in conjunction with the lever 6 via the rotating member 53, and the fixation of the filter unit 3 is released. When the filter unit 3 is to be fixed, the procedure described above may be performed in a reverse order. That is, the operator places the filter unit 3 to the predetermined position and then rotates the lever 6 to make the pressing member 7 abut against the filter case 33. Then, the operator rotates the screw shaft 651 to screw the screw shaft 651 forward with respect to the nut 63 and engages the locking member 655 and the locked portion 551. In this way, the filter unit 3 is fixed to the predetermined position.

Besides, in the fixing mechanism 5 of the embodiment, the link 61 of the lever 6 and the erection member 73 of the pressing member 7 are respectively connected to the bracket 51 via the second shaft 533 and the third shaft 535 in a way of rotating freely. According to this configuration, when the fixation of the filter unit 3 is released, the rotation angle of the lever 6 can be set small, and the fixing mechanism 5 can be configured more compactly. In addition, when releasing the fixation of the filter unit 3, the operator can push the lever 6 into the bracket 51 and place the lever 6 on the locked member 55. In this way, the lever 6 is prevented from falling down and obstructing the operation during the replacement operation of the filter unit 3. At this time, because the notch 631 of the nut 63 is engaged with the locked member 55, the falling-out of the lever 6 is prevented more suitably. The notch 631 is engaged with a corner portion of the locked member 55 in the embodiment, but a protrusion portion engaged with the notch 631 or the like may be arranged on the locked member 55.

As specifically shown by several examples, the disclosure is not limited to the configuration of the embodiment shown in the drawings and may be variously changed or applied without departing from the technical ideas of the disclosure.

What is claimed is:

1. An electric discharge machine comprising:
a machining tank in which a workpiece is accommodated;
a dirty fluid tank which stores a machining fluid drained from the machining tank;
a circulation pump which draws up the machining fluid in the dirty fluid tank;
a filter unit comprising a filter element which filters the machining fluid fed by the circulation pump and a filter case which accommodates the filter element;
a fixing mechanism which fixes the filter unit;
a clean fluid tank which stores the machining fluid filtered by the filter unit; and
a fluid feeding pump which draws up the machining fluid in the clean fluid tank and feeds the machining fluid to the machining tank; wherein
the fixing mechanism comprises:
a bracket which is fixed in a predetermined position;
a rotating member which is rotatably connected to the bracket;
a lever having a link of which one end is connected to the rotating member, a nut arranged on the other end of the link, and a rod screwed with the nut;
a locked member which is fixed to the bracket and engaged with the rod; and
a pressing member of which one end is connected to the rotating member and the other end presses the filter case.

2. The electric discharge machine according to claim 1, wherein the filter element has a hollow cylindrical shape, and
the filter case comprises:
an intermediate cylinder on which through-holes allowing the machining fluid to pass therethrough are formed and which is inserted into the filter element,
an outer cylinder on which through-holes allowing the machining fluid to pass therethrough are formed and which covers a side surface of the filter element, and
a pair of lids which are respectively arranged on both ends of the intermediate cylinder and the outer cylinder and block at least a space between the intermediate cylinder and the outer cylinder, wherein
one of the pair of lids is pressed by the pressing member, and the machining fluid is introduced from the other of the pair of lids.

3. The electric discharge machine according to claim 1, wherein the one end of the link is rotatably connected to the rotating member.

4. The electric discharge machine according to claim 3, wherein a notch is formed on the nut, and
the notch is capable of being engaged with the locked member.

5. The electric discharge machine according to claim 1, wherein the one end of the pressing member is rotatably connected to the rotating member.

6. The electric discharge machine according to claim 1, further comprising:
a filter chamber which accommodates the filter unit and the fixing mechanism and on which an opening is formed; and
an openable/closable or attachable/detachable door which is arranged at the opening of the filter chamber, wherein the lever extends to a side of the opening of the filter chamber.

* * * * *